US005482010A

United States Patent [19]
Lemberger et al.

[11] Patent Number: 5,482,010
[45] Date of Patent: Jan. 9, 1996

[54] COOLING SYSTEM FOR AN INTERNAL-COMBUSTION ENGINE OF A MOTOR VEHICLE WITH A THERMOSTATIC VALVE HAVING AN ELECTRICALLY HEATABLE EXPANSION ELEMENT

[75] Inventors: Heinz Lemberger, Unterfoehring; Gerhart Huemer, Neukeferloh; Peter Leu, Denkendorf, all of Germany

[73] Assignees: Bayerische Motoren Werke Aktiengesellschaft, Munich; Behr-Thomson-Dehnstoffregler GmbH & Co., Kornwestheim, both of Germany

[21] Appl. No.: 277,033

[22] Filed: Jul. 19, 1994

[30] Foreign Application Priority Data

Jul. 19, 1993 [DE] Germany .......................... 43 24 180.8
Mar. 19, 1994 [DE] Germany .......................... 44 09 547.3

[51] Int. Cl.⁶ ..................................................... F01P 7/14
[52] U.S. Cl. ........................................................ 123/41.1
[58] Field of Search ............................ 123/41.1; 236/34, 236/34.5

[56] References Cited

FOREIGN PATENT DOCUMENTS

3018682C2  11/1980  Germany .
3705232A1   9/1988  Germany .
4015806A1  11/1990  Germany .

Primary Examiner—Noah P. Kamen
Attorney, Agent, or Firm—Evenson, McKeown, Edwards & Lenahan

[57] ABSTRACT

In the case of a cooling system for an internal-combustion engine of a motor vehicle comprising a radiator and a thermostatic valve equipped with an electrically heatable expansion element, it is provided that, by means of three comparison stages which are connected in parallel, specifically a speed comparison stage, a load condition comparison stage and an intake air temperature comparison stage of a control, electric energy can be supplied to the expansion element of the thermostatic valve so that, depending on the demand, the temperature level of the coolant and thus of the internal-combustion engine switches from a high temperature level to a lower temperature level; that is, increases the cooling output depending on the demand.

5 Claims, 3 Drawing Sheets

COOLING SYSTEM FOR AN INTERNAL-COMBUSTION ENGINE OF A MOTOR VEHICLE WITH A THERMOSTATIC VALVE HAVING AN ELECTRICALLY HEATABLE EXPANSION ELEMENT

BACKGROUND AND SUMMARY OF THE INVENTION present invention relates to a cooling system for an internal-combustion engine of a motor vehicle comprising a radiator and a thermostatic valve which controls a flow of a coolant between the internal-combustion engine and the radiator in such a manner that, during a warm-up phase, the coolant coming from the internal-combustion engine flows back to the internal-combustion engine while bypassing the radiator through a short circuit. During an operating phase in a mixed operating mode, the coolant coming from the internal-combustion engine flows partially through the radiator and partially through the short circuit back to the combustion engine. In a further operating phase, in a cooling operating mode, the coolant coming from the internal-combustion engine flows back to the internal-combustion engine essentially through the radiator. The thermostatic valve, whose working range is fixed for the mixed operating mode to a predetermined temperature by the design of the expansion element, contains an electrically heatable expansion material. This material enlarges the opening cross-section in comparison to a position caused by the temperature of the coolant and can be supplied with electric energy by means of a control which receives the operating data of the internal-combustion engine and which, as a function of these operating data, controls the supply of electric energy to the expansion element in order to shift the working range of the thermostatic valve from the mixed operating mode to the cooling operating mode and back.

In a cooling system shown in German Patent Document DE 30 18 682 A1, an electric heating resistor is arranged in an expansion element of a thermostatic valve. This electric heating resistor can be supplied with electric energy through a stationarily held working piston. The supply of the electric energy takes place via a control device in order to keep the coolant temperature controlled by the thermostatic valve constant to a degree that is improved with respect to a normal thermostatic valve; i.e., in order to make a correction and shorten the control intervals. For this purpose, the actual coolant temperature is measured and is compared with a predetermined upper temperature valve and with a predetermined lower temperature value. When the upper temperature value is reached, the heating resistor is supplied with electric energy so that the thermostatic valve opens up more in order to obtain an increased cooling output and thus a lowering of the actual coolant temperature. When the actual coolant temperature falls below the lower temperature value, the supply of electric energy to the heating resistor is interrupted so that the expansion element is cooled by the colder coolant. As a result, the valve cross-section is reduced again so that the actual coolant temperature will rise again. These control cycles are repeated constantly in order to maintain a coolant temperature of, for example, 95° C. as constant as possible.

It is known from German Patent Document DE 37 05 232 A1 to provide, instead of a conventional thermostatic valve with an expansion element, a valve which can be controlled by means of a servomotor. In an embodiment, the servomotor is a thermostatic working element whose housing is stationarily arranged outside the valve housing. Inside the valve housing, a valve body is disposed which carries a main valve disk and a short-circuit valve disk in the arrangement known in the case of thermostatic valves. The working piston of the thermostatic working element serving as the servomotor is connected with the valve body. The housing of this thermostatic working element extends transversely with respect to a coolant pipe which leads back to the engine and extends around the valve housing. The housing of the working element projects out of this pipe and is surrounded in this area by a heating element. A control device, to which individual characteristic-diagram quantities are supplied which are sensed, for example, by sensors of the internal-combustion engine, is assigned to this heating device. In addition to the coolant temperature sensed in a forward flow pipe, the exhaust gas temperature and/or the rotational speed and/or the torque of the internal-combustion engine and/or the vacuum in the suction pipe and/or a pressure difference in a vacuum box and/or the oil temperature, or the like, are to be sensed as characteristic-diagram quantities.

In German Patent Application P 42 33 913.8, which is not a prior publication, an electrically heatable thermostatic valve for a coolant circulating system of an internal-combustion engine is disclosed. In the case of this thermostatic valve, the housing of the expansion element is held in a stationary manner by means of its end opposite a working piston and is provided with an electric heating element. The working piston is provided with a short-circuit valve disk and a main valve disk which is pot-shaped and surrounds the housing of the expansion element in a cage-like manner and to which a valve seat is assigned and is sealed off by an additional sealing point with respect to the housing of the expansion element or a holding device surrounding it. As a result of the supply of electric energy to the heating element, an additional control variable can be superimposed on the conventional coolant-temperature-dependent control of the thermostatic valve by means of which variable the main valve is opened more.

It is an object of the present invention to provide for a cooling system of the initially described type a control which is constructed to be as simple as possible, which, on the one hand, permits a lowering of the fuel consumption and an improvement of the exhaust gas composition but which, on the other hand, does not impair the operational reliability and the power output of the internal-combustion engine.

In a cooling system of the initially described type, this object is achieved in that the control comprises at least three comparison stages which are connected in parallel, which each compare an actual value with a predetermined value and, when this predetermined value is exceeded, open up the supply of electric energy to the expansion element. These comparison stages are constructed as a speed comparison stage which compares the actual speed of the vehicle with a predetermined speed value; a load-condition comparison stage which compares the actual load condition of the internal-combustion engine with a predetermined load condition value; and an intake air temperature comparison stage which compares the actual temperature of the air taken in by the internal-combustion engine with a predetermined temperature value.

As a result of the operation of the thermostatic valve, which is a function of the temperature of the coolant, a high coolant temperature and therefore a high engine temperature can be set while, at the same time, depending on the demand, a respective increased cooling output is made available by means of the control. As a result of the increased engine temperature, frictions, for example, are reduced so that the power consumption of the internal-combustion engine is lower. The fuel consumption can therefore be lowered while the exhaust gas composition is improved at the same time. The comparison stages provide that, when an increased cooling output is desired, a switching takes place to a lower temperature level. By means of the speed comparison stage, up to defined standard speeds, the consumption is minimized and the exhaust gas composition is improved. By means of the load condition comparison stage, which, starting at a predetermined load condition, supplies electric energy to the heating device of the expansion element, it is ensured that the power output of the internal-combustion engine is not reduced by an excessive operating temperature which could lead to an impaired volumetric efficiency and thus to a reduced power output. By means of the intake air temperature comparison stage, it is ensured that, for example, during a slow drive or in a traffic jam, the intake air temperature does not rise so much that, even when the power of the internal-combustion engine is relatively low, an insufficient fuel mixture is fed by which the operation of the internal-combustion engine may be disturbed. The three comparison stages therefore lead to a relatively simple control which, in an advantageous manner, takes into account the most important operating conditions of the internal-combustion engine of the vehicle and provides a cooling which in each case depends on the demand.

In certain embodiments of the invention, the control comprises a coolant temperature comparison stage which compares the actual temperature of the coolant with a desired temperature and, when the values of the actual temperature are below the desired temperature, blocks the feeding of electric energy to the expansion element. Thus, it is ensured that a control of the coolant temperature in the direction of a reduced temperature level will be carried out only when a minimum temperature, that is, the desired temperature, is already reached.

Other objects, advantages and novel features of the present invention will become apparent from the following detailed description of the invention when considered in conjunction with the accompanying drawings.

DETAILED DESCRIPTION OF THE DRAWINGS

Figure 1:
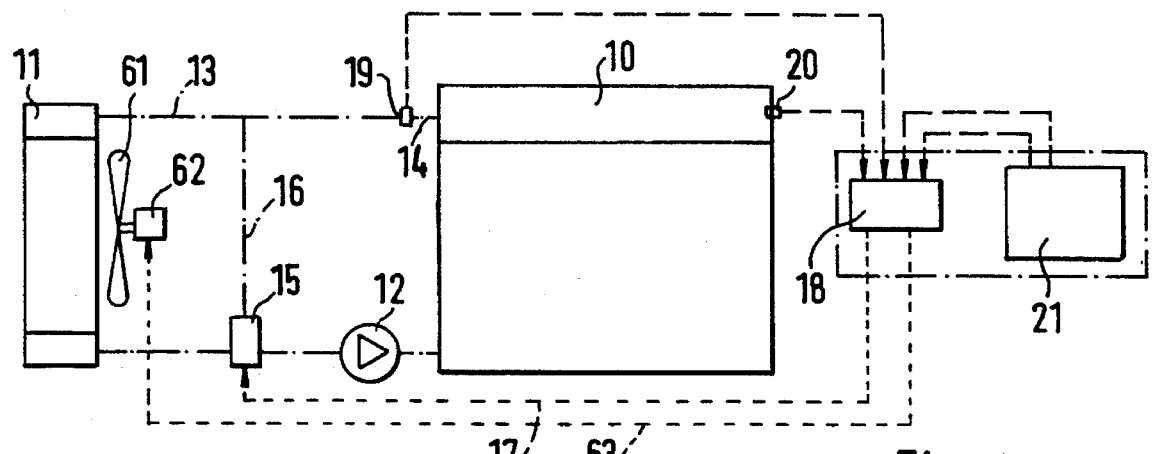
FIG. 1 is a schematic representation of a cooling system according to an embodiment of the present invention.

The cooling system for an internal-combustion engine 10 illustrated in FIG. 1 comprises a coolant radiator 11 to which a cooling blower 61 is assigned in a conventional manner. In the illustrated embodiment, the cooling blower 61 is provided with an electric driving motor 62 which can be switched on and off and which, as a rule, can also be operated by various power stages. In another embodiment, the cooling blower 61 is connected via a fluid coupling with the internal-combustion engine 10 whose filling can be varied in order to switch the cooling blower 61 on and off and operate it at different power stages. Between the internal-combustion engine 10 and the radiator 11, a flow of a coolant is generated by a coolant pump 12, particularly of a water mixed with an addition. From the internal-combustion engine 10, a forward-flow pipe 13 leads via an engine outlet 14 to the radiator 11, and a return-flow pipe leads from the radiator 11 back to the internal-combustion engine 10. In the return flow pipe, a thermostatic valve 15 is arranged whose design will be explained with reference to FIG. 2. A short-circuit pipe 16, which leads to the thermostatic valve 15, branches off pipe 13.

The cooling system operates essentially in three operating phases. In a first operating phase, after the start of the internal-combustion engine 10, the so-called warm-up phase, the thermostatic valve 15 is adjusted such that the coolant flow coming from the internal-combustion engine 10 is guided back essentially completely to the internal-combustion engine 10 via the short-circuit pipe 16. In another operating phase, the cooling system operates in the mixed operating mode; that is, the coolant coming from the internal-combustion engine 10 travels partially through the radiator 11 and partially via the short-circuit pipe 16 back to the internal-combustion engine 10. In another operating phase, the cooling system operates in the cooling operation; that is, the coolant coming from the internal-combustion engine 10 is guided back essentially completely through the radiator 11 to the internal-combustion engine 10.

When the cooling system operates in the mixed operating mode, it can be adjusted by the feeding of electric energy via a line 17 to the thermostatic valve in the direction of the cooling operating mode or can be switched over completely to the cooling operating mode. This reduces the temperature level of the coolant. When the supply of electric energy to the thermostatic valve 15 is interrupted again, the now cooler coolant will cool the thermostatic valve such that it will again take up its position for the mixed operating mode so that the coolant temperature is raised again. The supplying of the thermostatic valve 15 with electric energy is initiated by a control unit 18 which receives and analyzes several signals. At the engine outlet 14, a temperature sensor 19 is arranged which senses the actual temperature of the coolant and feeds it to the control unit 18. In a collector of the intake pipe of the internal-combustion engine 10, another temperature sensor 20 is arranged which senses the temperature of the intake air (fresh air) and feeds it to the control device 18. In addition, the control device 18 is connected to a known electronic engine control 21, such an electronic engine control sold by Robert Bosch AG under the "Motronik" trademark. This engine control 21 provides signals concerning the load condition of the internal-combustion engine 10 which are each a function of the combustion process (Otto process or diesel process) of the internal-combustion engine 10. They are, for example, directly or indirectly a function of the position of a throttle valve in the intake pipe. Also, the engine control 21 provides signals corresponding to the respective actual driving speed of a vehicle equipped with the internal-combustion engine and the cooling system. Naturally, it is possible to integrate the control 18 with its functions in the electronic engine control 21, for example, by the storage of corresponding software.

Figure 2:
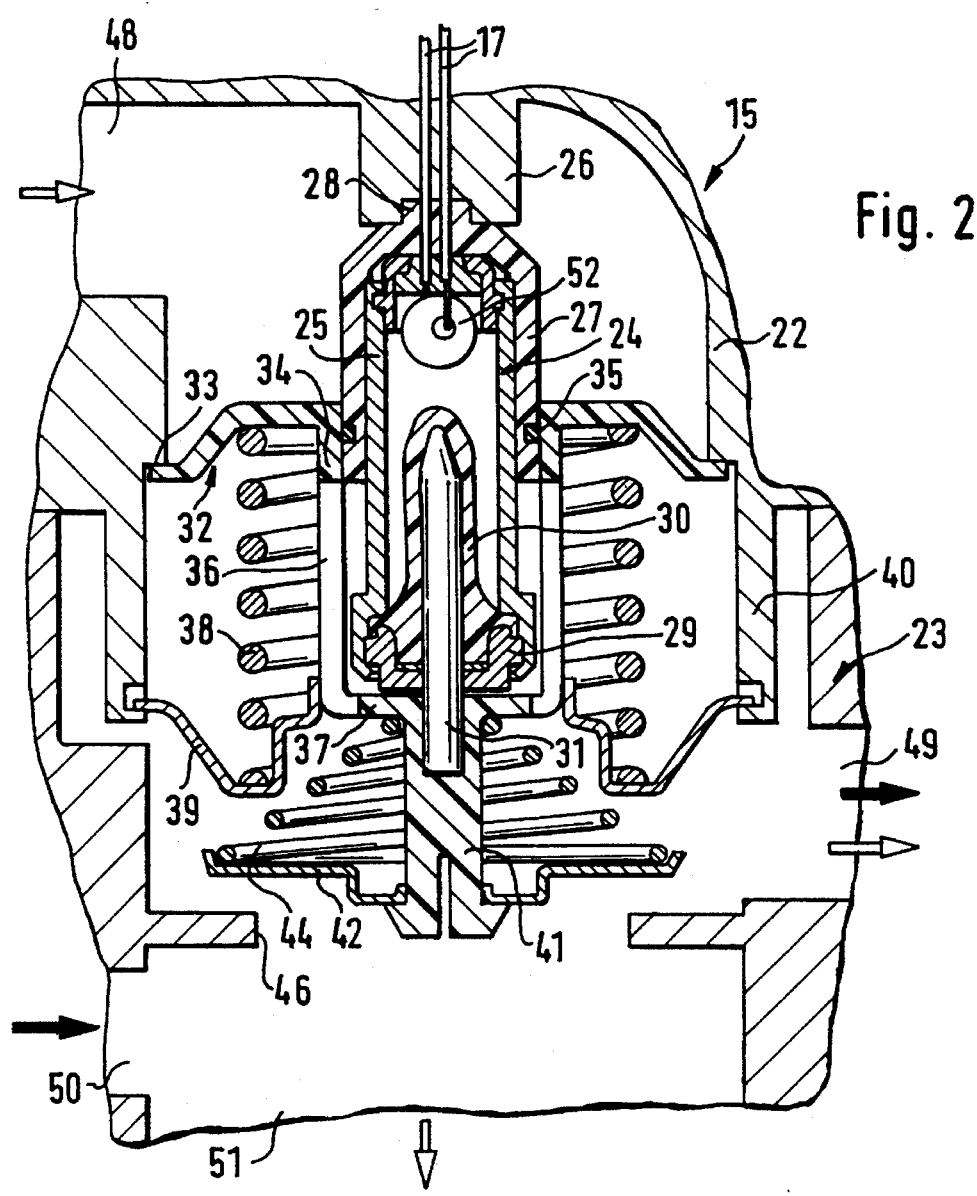
FIG. 2 is a sectional view of a thermostatic valve which is suitable for the cooling system according to the invention.

The thermostatic valve 15 illustrated in FIG. 2 comprises an expansion element 24 which is arranged in a valve housing formed by two parts 22, 23 and which is also called a thermostatic working element. This expansion element 24 has a housing 25 which is held in a stationary manner on a projection 26 of part 22 of the valve housing. The housing 25 is fitted into an approximately pot-shaped holder 27 which surrounds the housing 25 to approximately half of its axial length. By means of an extension 28, the holder 27 is inserted into the projection 26. An expansion material, particularly a wax mixture, is situated in the housing 25. The open end of the housing 25 is closed off by a flanged-in guiding insert 29 which holds a pocket-type membrane 30 extending into the interior of the housing 25. The pocket-type membrane 30 surrounds a working piston 31 which moves out of the housing 25 when the expansion material expands, which takes place at a predetermined temperature. The working piston 31 is connected with a valve disk 32 which has an essentially pot-shaped design and, starting from the open end of the housing 25, surrounds it up to the holder 27. A valve seat 33 of part 22 of the valve housing is assigned to the valve disk 32. The valve disk 32 has a closed collar 34 which, in the illustrated closed condition, forms a sealing point with the holder 27. In the area of this sealing point, the holder 27 is provided with a sealing ring 35 which is constructed particularly as an O-ring. Individual webs 36 adjoin the closed collar 34 and lead to the bottom 37 of the valve disk 32 which is connected with the working piston 31. The valve disk 32 is loaded by a closing spring 38 in the direction of the valve seat 33. The opposite end of the prestressed closing spring 38 is supported on a spring plate 39 which is held by several arms 40 which extend in parallel to the housing 25 and the closing spring 38.

The bottom 37 of the valve disk 32 is lengthened by a pin 41 which extends coaxially with respect to the working piston 31 and on which a short-circuit valve disk 42 is guided in a sliding manner. The initial position of the short-circuit valve disk 42, which is shown in FIG. 2, is determined by a flanging. In the axial direction, the short-circuit valve disk 42 can be displaced against the effect of a short-circuit spring 44 on the pin 41. The short-circuit spring 44 is situated between the short-circuit valve disk 42 and the bottom 37 of the valve disk 32.

Part 22 of the valve housing is provided with a connection opening 48 for the radiator return flow pipe. In the flow direction behind this connection 48, the valve disk 32 is situated which determines whether and how much coolant coming from the radiator 11 is returned via a connection 49 to the internal-combustion engine 10. Part 23 of the valve housing is also connected with a connection opening 50 for the short-circuit pipe 16. This connection is situated on the side of the short-circuit opening 46 facing away from the short-circuit disk 42. Part 23 of the valve housing is also provided with a connection opening 51 on the side of the short-circuit opening 46 facing away from the short-circuit disk 42, a pipe, which leads back to the radiator 11, connecting to the connection opening 51.

When the cold internal-combustion engine 10 is started, the elements of the thermostatic valve 15 are in the positions illustrated in FIG. 2. The coolant delivered by the coolant pump 12 is supplied via the connection opening 50 through the short-circuit pipe 16 because the valve disk 32 blocks the connection opening 48. The delivered coolant flows partially by way of the short-circuit opening 46 to the connection opening 49 leading to the internal-combustion engine 10 and partially by way of the connection opening 51 to the radiator 11.

The coolant, which flows in this condition from the connection opening 50 to the connection opening 49, also flows around the housing 25 of the thermostatic working element so that, when the coolant temperature rises, this working element and the expansion material contained in it are heated in an increasing manner. When the temperature is reached which is predetermined by the selection of the expansion material (defined wax mixture), the expansion material expands essentially linearly so that the working piston 31 is moved out. With the moving-out of the working piston 31, the valve disk 32 is lifted off the valve seat so that coolant flows via the connection opening 48 from the radiator 11 to the connection opening 49 to the internal-combustion engine 10. When the working piston 31 moves out, the short-circuit disk 42 is moved toward the short-circuit opening 46. In the completely moved-out position of the working piston 31, the short-circuit valve disk 42 will be placed against the short-circuit opening 46 and seal it off. In the abovementioned intermediate position, a mixed operating mode is obtained during which cooled coolant coming from the radiator 11 as well as uncooled coolant coming from the internal-combustion engine 10 are returned to the internal-combustion engine 10 via the connection opening 49. The expansion material of the expansion element 24 is designed such that in this position of the mixed operating mode, a defined operating temperature is set for the coolant and as a result for the internal-combustion engine. When the working piston 31 has moved out so far that the short-circuit disk 42 closes the short-circuit opening 46, a pure cooling operating mode is obtained; that is, only coolant cooled by the radiator 11 flows through the connection opening 48 via the connection opening 49 to the internal-combustion engine 10.

Inside the housing 25 of the expansion element 24, an electric heating element 52 is arranged which is supplied by way of an electric line 17 (more precisely, two lines) with electric voltage, particularly with a direct-current voltage of 12 volts. When the heating element 52 is supplied with electric energy, the expansion material is heated above the temperature provided to it by the flowing coolant so that the working piston 31 is moved out more. As a result, the operating condition of the thermostatic valve 15 is displaced in the direction of the pure cooling operating mode so that, as a result, the coolant temperature and therefore the operating temperature of the internal-combustion engine 10 can be lowered. In this case, intermediate positions of the mixed operating mode may be entered or a switch-over may take place from the mixed operating mode to the cooling operating mode.

Figure 5:
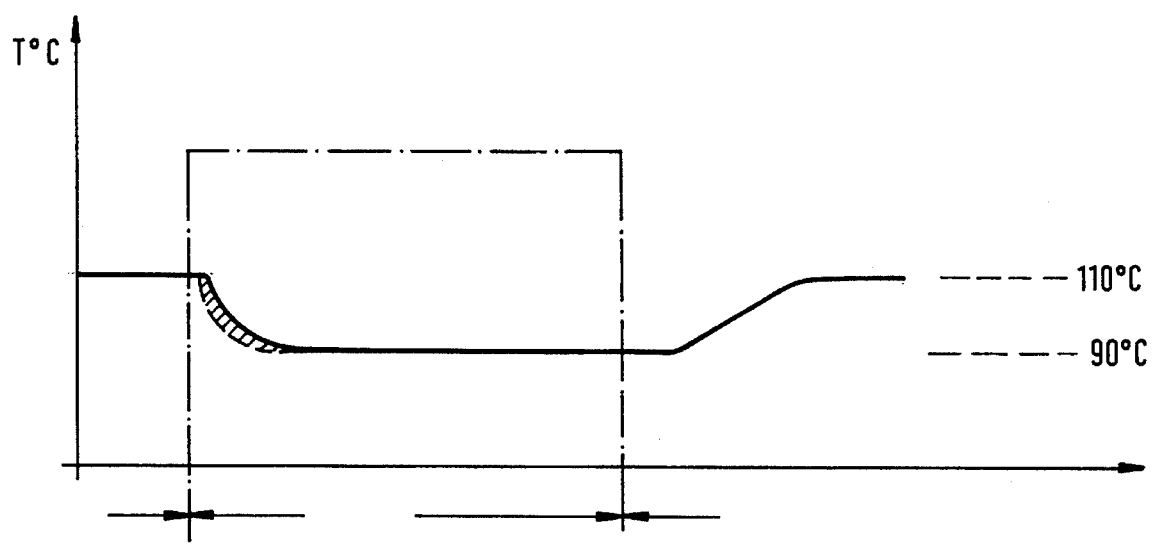
FIG. 5 is a view of the temperature course of the coolant temperature achieved in the cooling system according to the invention.

In FIG. 5, in a diagram (temperature over time), the course of the coolant temperature is shown during partial load and during full load, as can be achieved by means of the described cooling system and the described thermostatic valve 15. As a result of the composition of the expansion material, the expansion element 24 of the thermostatic valve 15 is designed for an operating temperature of above 100° C., in which case, in practice, 120° C. should not be exceeded. In the illustrated embodiment, a temperature of 110° C. is selected. This temperature is indicated by means of an upper interrupted line.

During a partial-load operation, the thermostatic valve 15 controls by means of the expansion element the coolant temperature to the temperature level of 110° C. This is expedient in order to reduce the fuel consumption by reducing friction or the like and, at the same time, improve the exhaust gas composition. During full-load, electric energy is supplied to the heating element 52 of the expansion element 24 of the thermostatic valve 15, as indicated by means of the dash-dotted curve, so that the expansion material is heated further and the working piston 31 is correspondingly moved out. In the maximal moved-out condition, the short-circuit valve disk 42 closes the short-circuit opening 46 so that a pure cooling operating mode is obtained. Under the condition that the cooling output of the radiator 11 is sufficient (possibly by using a cooling blower), a temperature level of, for example, 90° C. is achieved in the internal-combustion engine which is indicated in FIG. 5 by means of the lower interrupted line. When the operation of the internal-combustion engine 10 returns from full-load to partial load, the supply of electric energy to the heating element 52 is interrupted. The now cooler coolant, which flows around the expansion element 24, cools the expansion material and has the result that the working piston 31 is returned by means of the closing spring 38 into the position which corresponds to the coolant temperature. The thermostatic valve 15 will then again control the coolant temperature and thus the temperature of the internal-combustion engine 10 to the temperature level of, for example, 110° C. The lowering of the coolant temperature and thus of the temperature of the internal-combustion engine 10 during the-full-load operation to, for example, a temperature level of 90° C. has the advantage that the internal-combustion engine 10 can then yield the full power. It is therefore avoided that, because of an excessive temperature, a lower volumetric efficiency is obtained during the combustion which results in a power reduction. In order to reach the lower temperature level more rapidly, it is also provided that the cooling blower 61 is switched on during this lowering phase or, if it had already been switched on, is operated at a higher power stage. As a result, the temperature course can be obtained which is illustrated on the left in FIG. 5. This additional cooling is provided only for a limited selectable time period.

For the practical application, it is useful to provide the temperature control illustrated in FIG. 5 for the partial load and the full load also for other driving conditions. During very slow drives and at high outside temperatures and/or when the vehicle is in a traffic jam, there is the danger that the intake air is heated in a collector to such an extent that a correct mixture of fresh air and fuel can hardly be obtained in order to operate the vehicle in a safe manner. Also in this case, it is therefore provided that by means of the thermostatic valve 15 the cooling system is switched from the mixed operating mode at 110° C. to the pure cooling operating mode at which a temperature of, for example, 90° is obtained for the coolant and the internal-combustion engine 10. Furthermore, it is provided that the switch-over from the mixed operating mode, which sets a high temperature level of, for example, 110° C., to the pure cooling operating mode, which causes a temperature level of, for example, 90° C., takes place as a function of the speed at which the vehicle is driving. In this case, it is provided that, when a desired speed is reached or exceeded, a switching-over takes place from the mixed operating mode to the cooling operating mode. In this case, the desired speed can be fixed such that it takes into account the standard speeds corresponding to various countries. The higher temperature level is therefore maintained as long as the standard speed is not exceeded, for example, a speed of 130 km/h.

Figure 3:
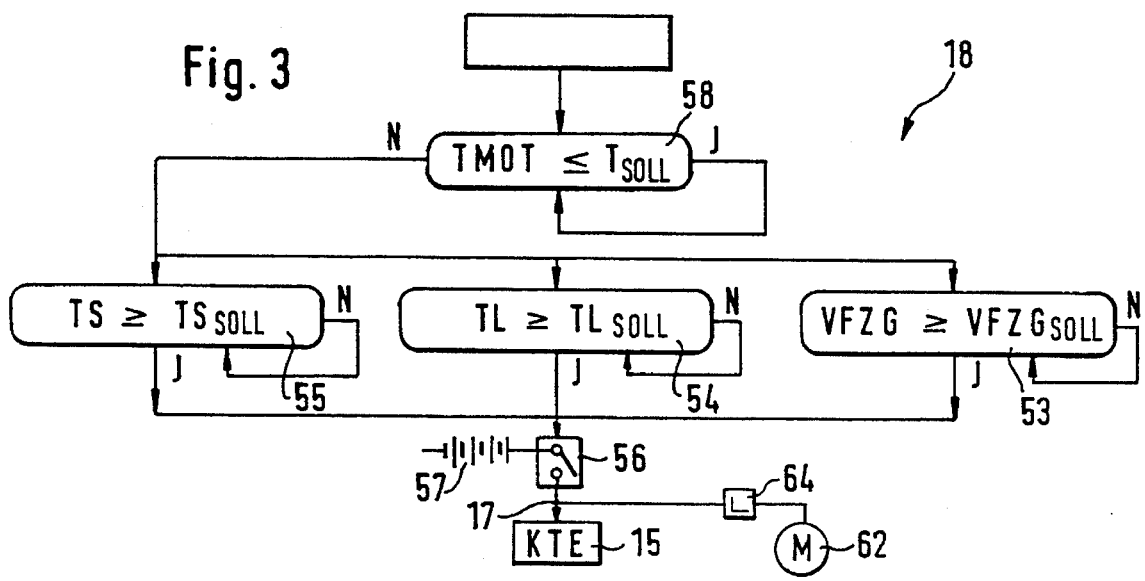
FIG. 3 is a flow chart of a control which is suitable for the cooling system according to the invention.

In FIG. 3, illustrates in a flow chart how the above-mentioned operating conditions are linked with one another to actuate a switching of the thermostatic valve 15 from the mixed operating mode to the pure cooling operating mode of the cooling system. The control device 18 comprises three comparison stages 53, 54, 55 which each cause the closing of a switch 56 which connects, in the closed condition, an electric energy source 57 with the heating device 52 of the expansion element 24 of the thermostatic valve 15. The comparison stage 53 compares the ACTUAL vehicle speed (VFZG) with a DESIRED vehicle speed (VFZG$_{des}$). The DESIRED vehicle speed is fixed to 130 km/h. Thus, it is ensured that the high coolant temperature level, for example, is maintained during an exhaust gas test or a partial load condition if different conditions do not occur. The ACTUAL vehicle speed may be supplied to the control device 18 via a speedometer. However, modern motor vehicles are equipped with an electronic engine control at which a signal is already generated which corresponds to the vehicle speed and which may be fed into the control device 18 and compared with the DESIRED speed.

The comparison stage 54 compares a load signal (TL) with a given threshold value (TL$_{des}$). This predetermined threshold value may be fixed, for example, to 50% to 70% of the full load of the internal-combustion engine 10. When the load signal (TL) reaches or exceeds the predetermined threshold value (TL$_{des}$), the switch 56 is correspondingly closed again. The load signal (TL) may be obtained, for example, via the position of a throttle valve in the intake duct of the internal-combustion engine or by way of determination of an air quantity per stroke which is taken in corresponding to this position. This signal (TL) is also available at the electronic engine control devices 21 normally used today and can be tapped there.

Comparison stage 55 compares a signal (TS) of the sensor 20 measuring the ACTUAL temperature of the intake air with a predetermined threshold value (TS$_{des}$). This DESIRED value or threshold value may, for example, be fixed to 50° C. When the ACTUAL value of the intake fresh air reaches or exceeds this threshold value, the switch 56 is closed and the thermostatic value 15 is switched over from the mixed operating mode to the cooling operating mode.

Since it makes no sense to switch to the cooling operating mode before the lower coolant temperature level of, for example, 90° C. (FIG. 5) is reached, another comparison stage 58 is connected in front of the above-explained comparison stages 53, 54, 55 which becomes operative with the start of the internal-combustion engine. This comparison stage 58 compares the ACTUAL coolant temperature (TMOT) sensed by means of the sensor 19 with a DESIRED temperature value (T$_{des}$) which is set, for example, to 90° C., corresponding to the lower coolant temperature level. Only when this comparison stage 58 indicates that the ACTUAL coolant temperature (TMOT) has reached or exceeded the DESIRED value (T$_{des}$), the transmission of the signals of the comparison stages 53, 54 or 55 to the switch 56 is opened up.

With the feeding of electric energy to the thermostatic valve 15, the switch 56, simultaneously switches on the drive 62 of the cooling blower 61; i.e., it causes a current supply to the pertaining electric driving motor or an increase of the filling of a fluid coupling. As a result, the lower temperature level is reached more rapidly. The switching-on of the cooling blower therefore takes place only for a limited time period. The fixing of the time period takes place by means of a time function element 64 which is only outlined in FIGS. 3 and 4.

Figure 4:
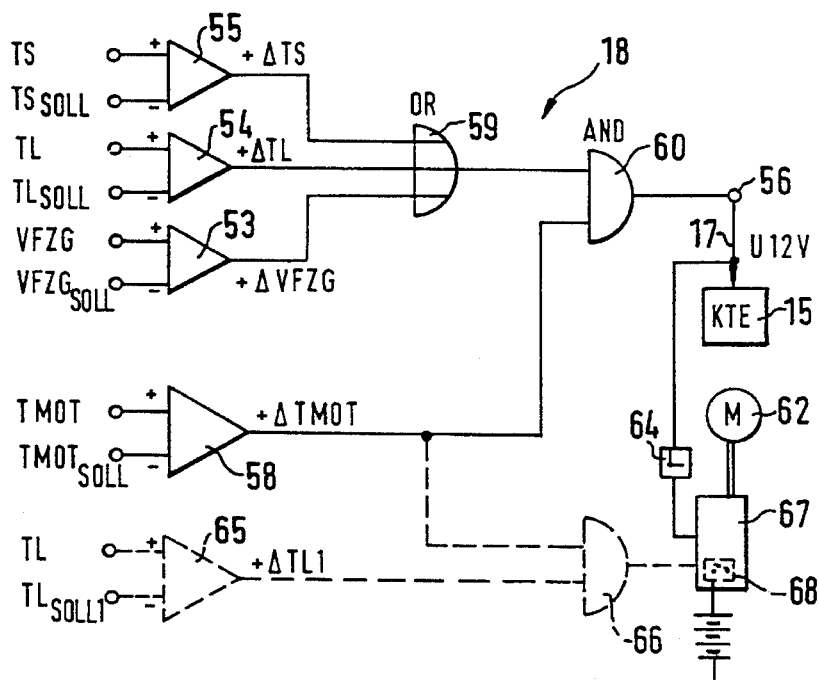
FIG. 4 is a logic diagram for a control of the cooling system.

FIG. 4 is a logic diagram for the flow chart according to FIG. 3. The comparison stages 53, 54, 55 are connected to an OR-element 59 which transmits each of the signals of the comparison stages 53, 54, 55 to an AND-element 60. The comparison stage 58 is also connected to an input of the AND-element 60. The switch 56 is controlled by the AND-element 60 when the signal of comparison stage 58 and a signal of one of comparison stages 53, 54, 55 is present. The heating of the thermostatic valve 15 for the switch-over to the lower temperature level therefore takes place only when a sign reversal takes place in the OR/AND operation because of an exceeding of the threshold value of the voltage difference signal. As long as no such signal occurs, the thermostatic valve 15, as a mechanical element, takes over the control of the upper temperature level (external control circuit). When electric energy is supplied to the thermostatic valve 15, a switch-over takes place via the switching logic corresponding to the internal thermodynamic conditions of the internal-combustion engine 10 to a selectable lower temperature level (internal control circuit). A cooling of the internal-combustion engine is also avoided because of the fact that the coolant temperature comparison stage 58 prevents a further feeding of current to the thermostatic valve 15 when the coolant temperature falls below the preselected lower temperature.

In most cases, it will be useful to directly determine the signals which are a function of the operating data. However, an indirect determination is also possible. For example, instead of the direct measuring of the temperature of the coolant, the temperature may also be measured on a representative component whose temperature has a defined relationship to the coolant temperature. Likewise, it is possible instead of carrying out a direct measuring of the intake air temperature, to measure the temperature of a component which is representative of this value or to measure the engine space temperature. Via the opening time of injection valves, the load condition may also be sensed according to the fed fuel quantity. The driving speed may also be determined via the rotational speed of the internal-combustion engine while taking into account the transmission gear, or via the speed of the air which flows toward the vehicle.

In FIG. 4, a further development is illustrated by an interrupted in line which the cooling blower 61 is included in another comparison stage 65. Comparison stage 65 compares the actual load condition signal (TL) with a threshold value ($TL_{DES\ 1}$), a signal being emitted when this threshold value is exceeded. The threshold value ($TL_{DES\ 1}$) is clearly above the threshold value ($TL_{DES}$). The logic diagram provides that the blower 61 is switched on only when this signal ($TL_1$) occurs. For this purpose, this signal closes a switch 68 of the cooling blower control 67 to allow the cooling blower 61 to be switched on.

The predetermined values for the condition description of the intake air (parameter for the filling ratio of the combustion space), the condition description of the engine load (parameter for the engine operating point), and the condition description of the vehicle movement (parameter for the vehicle speed) need not be stored in the control 18 as a respective absolute single value. In certain embodiments, a plurality of given values are stored in the manner of a characteristic diagram. These stored values correspond to a basic value which was corrected because of the influence of other operating data. The corrected value, which is stored in a type of characteristic diagram, will then be called when these operating data are present and are processed in the comparison stage together with the actual value. Naturally, it is then also provided that the other operating data are sensed and fed into the control 18. These operating data may be sensed at electronic engine controls 21.

The characteristic diagram for the condition description of the intake air ($TS_{DES}$) is formed from a basic value of the intake air temperature which is corrected as a function of the outside temperature and/or of the engine space temperature. A characteristic diagram for the condition description of the vehicle movement ($VFZG_{DES}$) may be formed from a basic value which is corrected as a function of the rotational engine speed and/or a signal indicating the driving position. A characteristic diagram for the condition description of the engine load ($TL_{DES}$) may consist, for example, of a basic value corresponding to the throttle valve position or a quantity depending on it, which basic value is corrected as a function of the injection point in time and/or of the injected amount and/or of the exhaust gas temperature and/or of the engine oil temperature and/or of the transmission oil temperature and/or of the rotational engine speed and/or of the signal of a lambda probe and/or of the temperature of a component of the cylinder head or of the crankcase.

Also the DESIRED temperature ($TMOT_{DES}$) of the coolant must not be only a single predetermined value. On the contrary, different DESIRED values may be fed to the coolant temperature comparison stage 58 which may be called from characteristic diagrams stored in the electronic engine control device 21. Any of these fed DESIRED temperatures ($TMOT_{DES}$) has the effect that, when the ACTUAL coolant temperature falls below the predetermined value, the supply of electric energy to the expansion element 24 is interrupted. The coolant temperature will then be set to approximately this DESIRED value ($TMOT_{DES}$).

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:
1. A cooling system for an internal-combustion engine of a motor vehicle comprising:
   a radiator;
   a thermostatic valve coupled between the radiator and the internal-combustion engine and which controls a flow of a coolant between the internal-combustion engine and the radiator such that:
      during a warm-up phase, coolant from the internal-combustion engine flows substantially back to the internal-combustion engine while bypassing the radiator through a short circuit;
      during an operating phase in a mixed operating mode, the coolant from the internal-combustion engine flows partially through the radiator and partially through the short circuit back to the internal-combustion engine; and
      during a further operating phase, in a cooling operating mode, the coolant from the internal-combustion engine flows back to the internal-combustion engine substantially through the radiator;
   the thermostatic valve having an expansion element that fixes the working range for the mixed operating mode to a predetermined temperature, the expansion element containing an electrically heatable expansion material which, for enlarging a valve opening cross-section in comparison to a position caused by the temperature of the coolant, is suppliable with electrical energy;
   a control, coupled to the expansion element, which receives operating data of the internal-combustion engine and which, as a function of these operating data, controls the supply of electric energy to the expansion element to shift the working range of the thermostatic valve from the mixed operating mode to the cooling operating mode and back, wherein the control has at least three comparison stages which are connected in parallel, each of said comparison stages comparing a respective actual value (VFZG; TL; TS) with a respective predetermined value ($VFZG_{des}$; $TL_{des}$; $TS_{de}$) and, when said respective predetermined value is exceeded, opens up the supply of electric energy to the expansion element, said comparison stages including:

a speed comparison stage which compares actual speed of the motor vehicle (VFZG) with a predetermined speed value ($VFZF_{des}$); a load condition comparison stage which compares an actual load condition (TL) of the internal-combustion engine with a predetermined load condition value ($TL_{des}$), and an intake air temperature comparison stage which compares an actual temperature of air taken in by the internal-combustion engine with a predetermined temperature value ($TS_{des}$).

2. A cooling system according to claim 1, wherein the control further includes a coolant temperature comparison stage which compares an actual temperature (TMOT) of the coolant with a desired temperature ($TMOT_{des}$) and which, when values of the actual temperature are below the desired temperature, blocks the feeding of electric energy to the expansion element.

3. A cooling system according to claim 2, wherein the coolant temperature comparison stage is switched with priority with respect to the speed comparison stage, the load condition comparison stage and the intake air temperature comparison stage.

4. A cooling system according to claim 3, further comprising a cooling blower assigned to the radiator, and a cooling blower control coupled to the cooling blower to switch the cooling blower on and off, the cooling blower also being switchable over to different power stages, wherein the control is connected to the cooling blower control so as to switch on the cooling blower when there is a switch-over to a lower temperature level and/or to switch the cooling blower over to a higher power stage.

5. A cooling system according to claim 4, further comprising an adjustable time function element that connects the control with the cooling blower control such that the control switches off the cooling blower after a predetermined time period and/or switches the cooling blower back to a lower power stage.

\* \* \* \* \*